(12) United States Patent
Goldstein

(10) Patent No.: US 11,885,623 B1
(45) Date of Patent: *Jan. 30, 2024

(54) SYSTEM AND METHOD FOR MAPPING A POSITION ON A NON-LINEAR NAVIGATIONAL CHART

(71) Applicant: Hilton Goldstein, Coral Springs, FL (US)

(72) Inventor: Hilton Goldstein, Coral Springs, FL (US)

(*) Notice: Subject to any disclaimer, the term of this patent is extended or adjusted under 35 U.S.C. 154(b) by 732 days.

This patent is subject to a terminal disclaimer.

(21) Appl. No.: 16/698,413

(22) Filed: Nov. 27, 2019

Related U.S. Application Data

(63) Continuation-in-part of application No. 15/476,552, filed on Mar. 31, 2017, now Pat. No. 10,473,484.

(60) Provisional application No. 62/316,577, filed on Apr. 1, 2016.

(51) Int. Cl.
| | | |
|---|---|---|
| G01C 21/30 | (2006.01) | |
| H04M 1/725 | (2021.01) | |
| G01S 19/42 | (2010.01) | |
| G09B 29/00 | (2006.01) | |
| G08G 1/0968 | (2006.01) | |

(52) U.S. Cl.
CPC .............. *G01C 21/30* (2013.01); *G01S 19/42* (2013.01); *G09B 29/00* (2013.01); *H04M 1/725* (2013.01); *G08G 1/096883* (2013.01)

(58) Field of Classification Search
CPC ......... G01C 21/30; G01S 19/04; G01S 19/02; G09B 29/00; H04M 1/725; G08G 1/096; G08G 1/883
See application file for complete search history.

(56) References Cited

U.S. PATENT DOCUMENTS

| | | | | |
|---|---|---|---|---|
| 10,473,484 | B1* | 11/2019 | Goldstein | ............ G08G 5/0052 |
| 2015/0253141 | A1* | 9/2015 | Kesting | .................. G01C 21/30 |
| | | | | 701/409 |
| 2018/0196424 | A1* | 7/2018 | Kim | ..................... G05D 1/0044 |

* cited by examiner

*Primary Examiner* — James M McPherson
*Assistant Examiner* — Bakari Underwood
(74) *Attorney, Agent, or Firm* — John Rizvi; John Rizvi, P.A.—The Patent Professor

(57) ABSTRACT

A system and method for mapping a mobile device position on segments that lie between waypoints on a non-linear map by converting real world geographic coordinates of a mobile device to image X, Y coordinates using an image X, Y length or scale of a respective segment as a basis for the conversion. The mobile device position may be mapped in real time and presented to a user via a mobile device. The coordinate may be mapped in real-time to a specific X, Y location on the map and may be presented to a user on a screen, stored in a database, or used in any appropriate way.

15 Claims, 6 Drawing Sheets

SYSTEM AND METHOD FOR MAPPING A POSITION ON A NON-LINEAR NAVIGATIONAL CHART

CROSS-REFERENCE TO RELATED APPLICATION

This is a Continuation in Part application that claims the benefit of U.S. Non Provisional patent application Ser. No. 15/476,552, filed Mar. 31, 2017, which in turn claims priority to U.S. Provisional Patent Application Ser. No. 62/316,577, filed Apr. 1, 2016, all entirely incorporated herein.

FIELD OF THE INVENTION

The present invention relates generally to mapping systems, and more particularly to a system and method for mapping a mobile device position on a non-linear navigational chart.

BACKGROUND OF THE INVENTION

It is common for a mobile device, or a user thereof, to require navigational assistance or be required to follow a particular navigational plan. A mobile device user may have downloaded a navigational map with waypoints, and the user may need to navigate through the waypoints using their mobile device. For example, in low visibility conditions or at night, a mobile device user may require guidance to avoid terrain, obstacles, or traffic. As a non-limiting example, such navigational charts may be for navigating on foot, ground vehicle, or water vehicle and commonly for aircraft (e.g. via a STAR chart).

However, it is common for navigational charts to be non-linear or not to scale with respect to real geographic coordinates or distances. For example, a length ratio of two segments on a navigational chart may not be the same for corresponding segments on earth. As such, mapping a position of a device on such non-linear charts is problematic, difficult, and inaccurate using conventional methods.

As such, there exists a need for a system for mapping a position of a device on a non-linear navigational chart.

SUMMARY OF THE INVENTION

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A system for mapping a position on a navigational chart, comprising: one or more storage machines holding instructions executable by one or more logic machines to:
 receive a navigational chart;
 receive geographic coordinates of a mobile device as mobile device geographic coordinates;
 identify georeferenceable points on the navigational chart;
 receive geographic coordinates of the georeferenceable points as point geographic coordinates;
 map a position of the mobile device on the navigational chart according to the point geographic coordinates and the mobile device geographic coordinates;
 identify a segment between two of the georeferenceable points;
 map the position of the mobile device on the navigational chart according to the segment; and
 wherein a length ratio between two of the segments is not equal to a length ratio between corresponding real physical geographic distances.

In another aspect, the segment is one of a plurality of segments, the segment being nearest the mobile device.

In another aspect, the segment is one of a plurality of segments, the segment being nearest a point geographic coordinate of one of the georeferenceable points.

In another aspect, the instructions executable to map the position of the mobile device on the navigational chart include instructions executable to convert the point geographic coordinates to image coordinates using a geographical image scale of the segment.

In another aspect, the instructions are executable to map the position of the mobile device with respect to the segment via one or both of interpolation and extrapolation such that,
 the georeferenceable points have respective image points on the navigational chart, the image points having image X-Y coordinates that define their location on the navigational chart;
 via interpolation a segment between two image points on the navigational chart is generated as a linear interpolant;
 via extrapolation, an image point lying outside a domain of the linear interpolant is determined; and
 by using the interpolant as a basis and via extrapolation, the system maps a position of the mobile device on the navigational chart with respect to the segment that was generated as the linear interpolant.

In another aspect, the segment is a first segment associated with a first geographical image scale, and the instructions executable to map the position of the mobile device on the navigational chart include instructions executable to:
 identify a second segment associated with a second geographical image scale; and
 upon identifying the second segment as being nearest the mobile device, change an aspect of the mapping according to the second geographical image scale.

In another aspect, the instructions are executable to identify the segment are executable to connect the two georeferenceable points.

In another aspect, the geographic coordinates of the mobile device are received from a GPS locator located at the mobile device.

In another aspect, the instructions are further executable to display on a display device the navigational chart including the position of the mobile device.

In another aspect, the navigational chart is non-linear.

In another aspect, the navigational chart is one of a STAR, a DP, and an IAP chart.

Further disclosed is a method for mapping a position on a navigational chart, comprising:
 receiving a navigational chart;
 receiving geographic coordinates of a mobile device as mobile device geographic coordinates;
 identifying georeferenceable points on the navigational chart;
 receiving geographic coordinates of the georeferenceable points as point geographic coordinates;

mapping a position of the mobile device on the navigational chart according to the point geographic coordinates and the mobile device geographic coordinates;
identifying a segment between two of the georeferenceable points;
mapping the position of the mobile device on the navigational chart with respect to the segment;
wherein the position is mappable offset from the segment to represent a position of the mobile device not on the segment.

In another aspect, mapping the position of the mobile device on the navigational chart includes converting the point geographic coordinates to image coordinates using a geographical image scale of the segment.

In another aspect, the segment is a first segment associated with a first geographical image scale, the method further comprising:
identifying a second segment associated with a second geographical image scale; and
upon identifying the second segment as being nearest the mobile device, changing an aspect of the mapping according to the second geographical image scale.

In another aspect, the navigational chart is non-linear, and the navigational chart is one of a STAR, a DP, and an IAP chart.

Furthermore, disclosed is a computing device for mapping a position on a navigational chart, comprising:
a logic machine; and
a storage machine holding instructions executable by the logic machine to:
receive, from a navigational chart server, a navigational chart for a mobile device;
receive, from a GPS locator of the mobile device, geographic coordinates of the mobile device as mobile device geographic coordinates;
identify a plurality of georeferenceable points on the navigational chart;
receive geographic coordinates of the plurality of georeferenceable points as point geographic coordinates;
identify a first segment between a first pair of the plurality of georeferenceable points, the first segment being a nearest segment among a plurality of segments nearest the mobile device;
map a position of the mobile device on the navigational chart according to the point geographic coordinates, the mobile device geographic coordinates, and a first geographic scale of the first segment; and
display, on a display device, the navigational chart including the position of the mobile device;
wherein the instructions are further executable to update the navigational chart and the position of the mobile device in real-time according to the first geographical image scale;
wherein the instructions are further executable to:
identify a different segment of the plurality of segments between a different pair of the plurality of georeferenceable points, the different segment identified as being nearest the mobile device;
in response to identifying the different segment as being nearest the mobile device, map the position of the mobile device on the navigational chart according to a different geographical image scale of the different segment; and
wherein differing geographical image scales means a length ratio between two of the segments is not equal to a length ratio between corresponding real physical geographic distances.

In another aspect, the instructions are executable to:
display, on a display device, the navigational chart including the position of the mobile device as a moving icon having an icon movement speed across the displayed navigational chart; and
wherein the navigational chart is non-linear such that, while the mobile device has a constant real-world physical speed with respect to real-world positions represented by at least two segments of the segment, the icon's movement speed with respect to a displayed first segment of the two segments is different from the icon's movement speed with respect a displayed second segment of the two segments, while the mobile device has a constant real-world physical speed.

In another aspect, the mobile device is a smart phone.

In another aspect, the mobile device is positioned on a person for use in navigating on foot.

In another aspect, the mobile device is positioned on a ground vehicle.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the claimed subject matter will hereinafter be described in conjunction with the appended drawings provided to illustrate and not to limit the scope of the claimed subject matter, where like designations denote like elements, and in which:

It is to be understood that like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 2. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
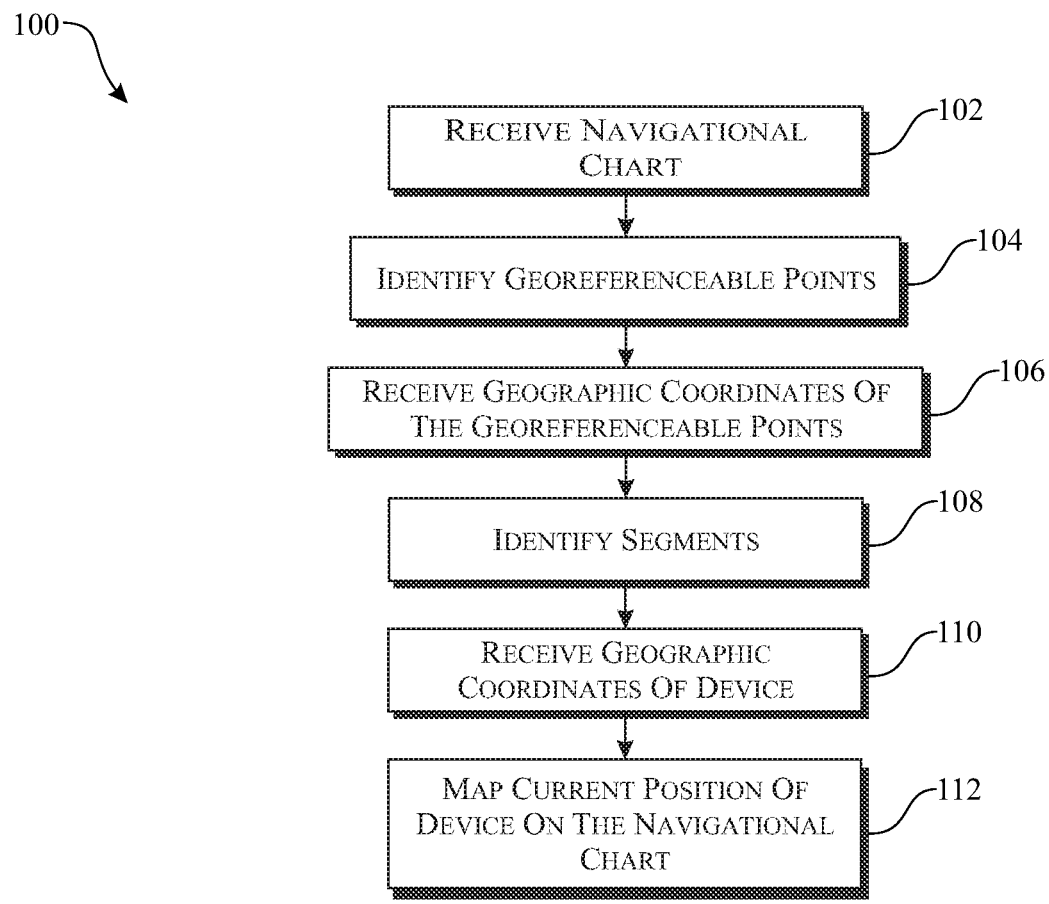
FIG. 1 presents an exemplary method of mapping a position of a device, in accordance with aspects of the present disclosure.

The illustration of FIG. 1 presents an exemplary method 100 of mapping a position of a device on a non-linear navigational chart. The method 100 may be executed by a device mapping system 400 shown in FIG. 4. For example, the method may be executed according to machine-readable instructions stored in the system. It is to be understood that the steps of method 100 may be executed in any appropriate order. In some embodiments, the steps are executed in the order shown in FIG. 1 or in an order described herein. In some embodiments, steps 102, 104, and 106 are a preprocessing step, while steps 108, 110, and 112 are steps executed in real-time.

It is to be understood that the tracked and mapped device may provide GPS coordinates for the mapping functions and method described herein. However, it is to be understood that any appropriate coordinates, or source of coordinate data, may be used to effect the functions and methods described herein. Therefore, whenever the herein disclosure refers to "coordinates" it is to be understood that the spirit and scope of the disclosure is not to be limited to a specific type of coordinate data source, and instead, the source of the coordinate data could be any appropriate source. For example, the source of such coordinate data could be calculated (e.g. the midpoint between two known coordinates), or they could come from an aircraft's INS. Therefore, wherever this disclosure refers to a location of the tracked mobile device, this could generally refer to input coordinates from any appropriate source. These input coordinates could originate from a pre-specified data set.

Figure 4:
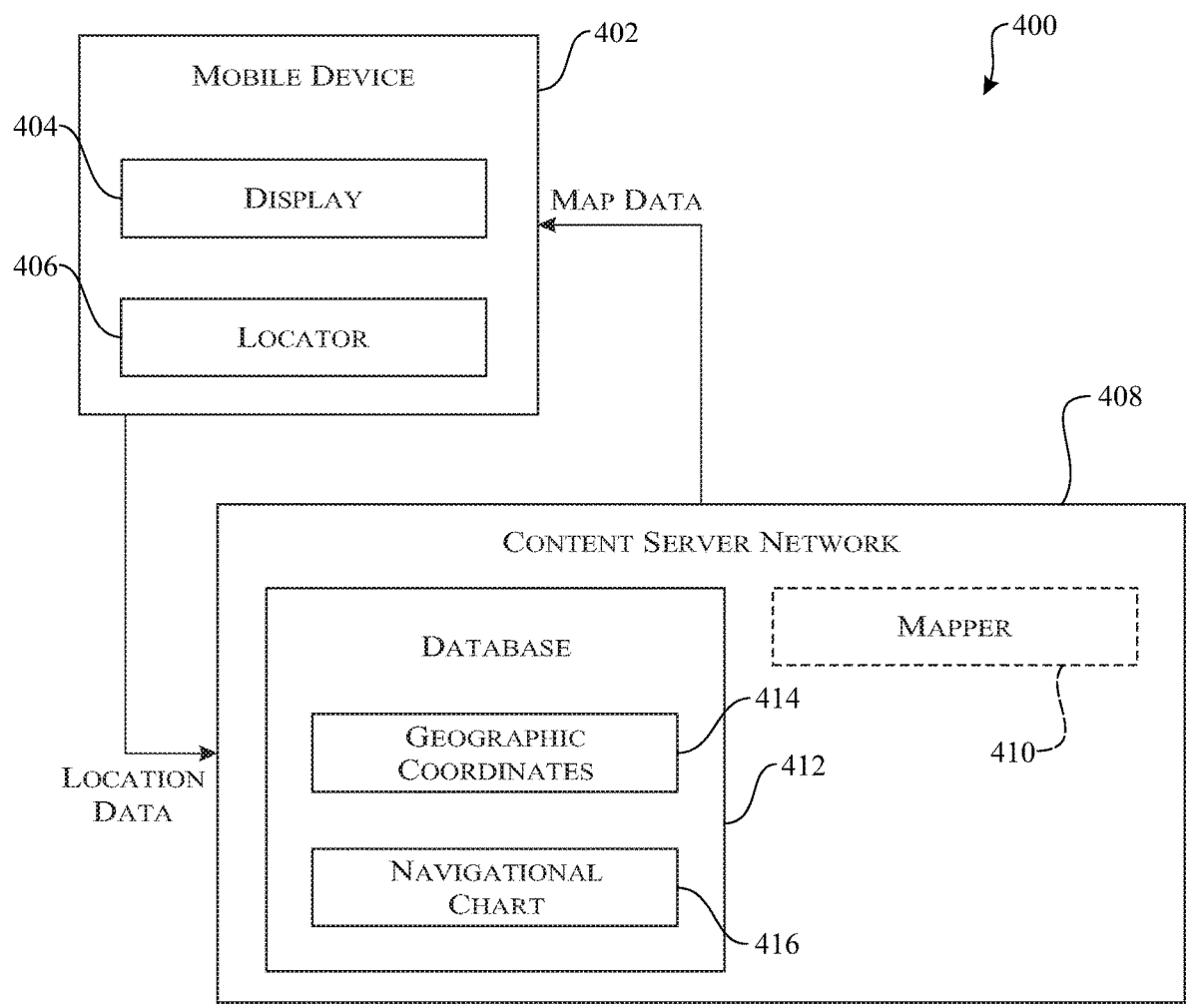
FIG. 4 presents an exemplary device mapping system, in accordance with aspects of the present disclosure.
Figure 5:
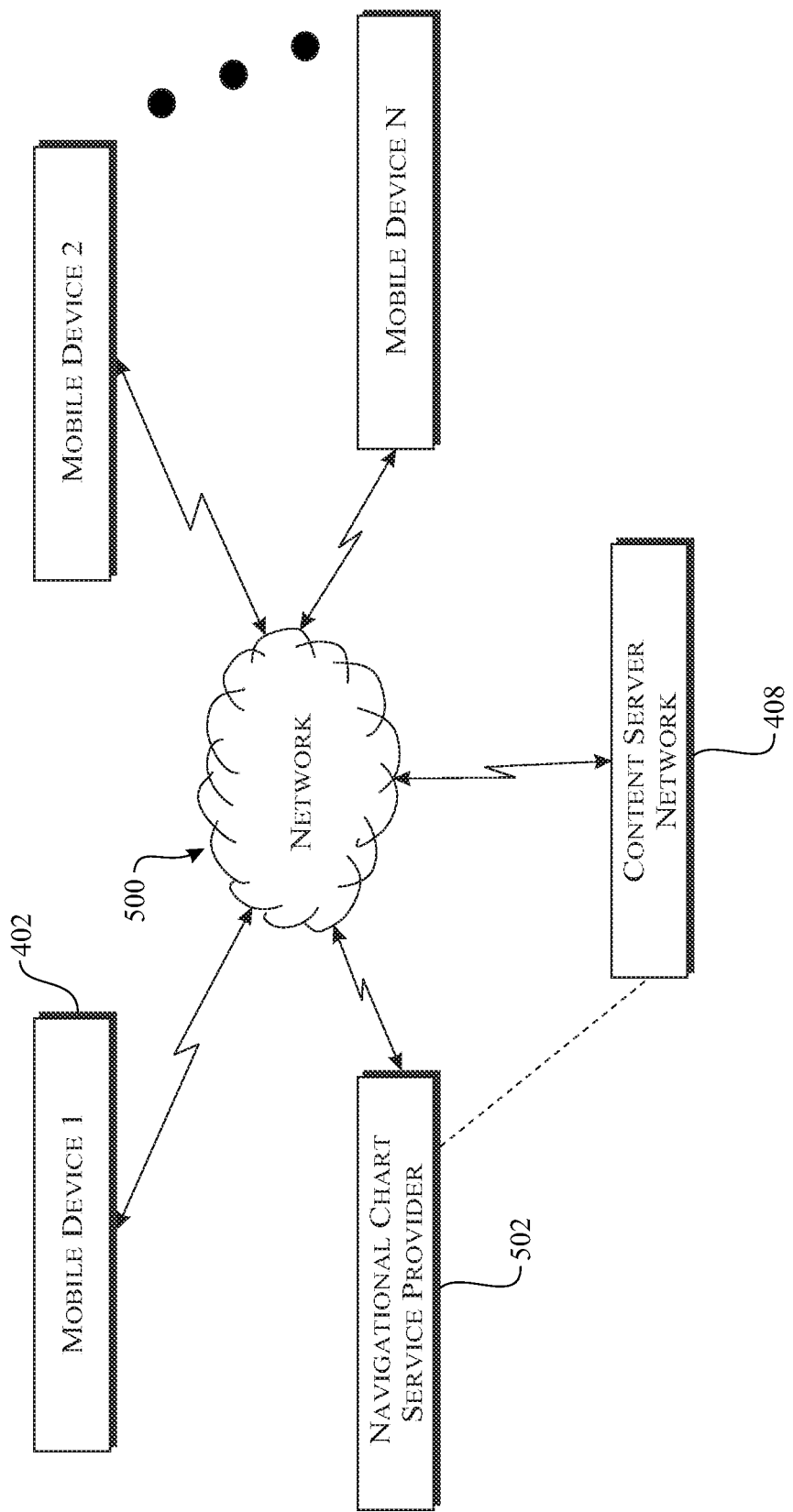
FIG. 5 presents an exemplary network, in accordance with aspects of the present disclosure.
Figure 6:
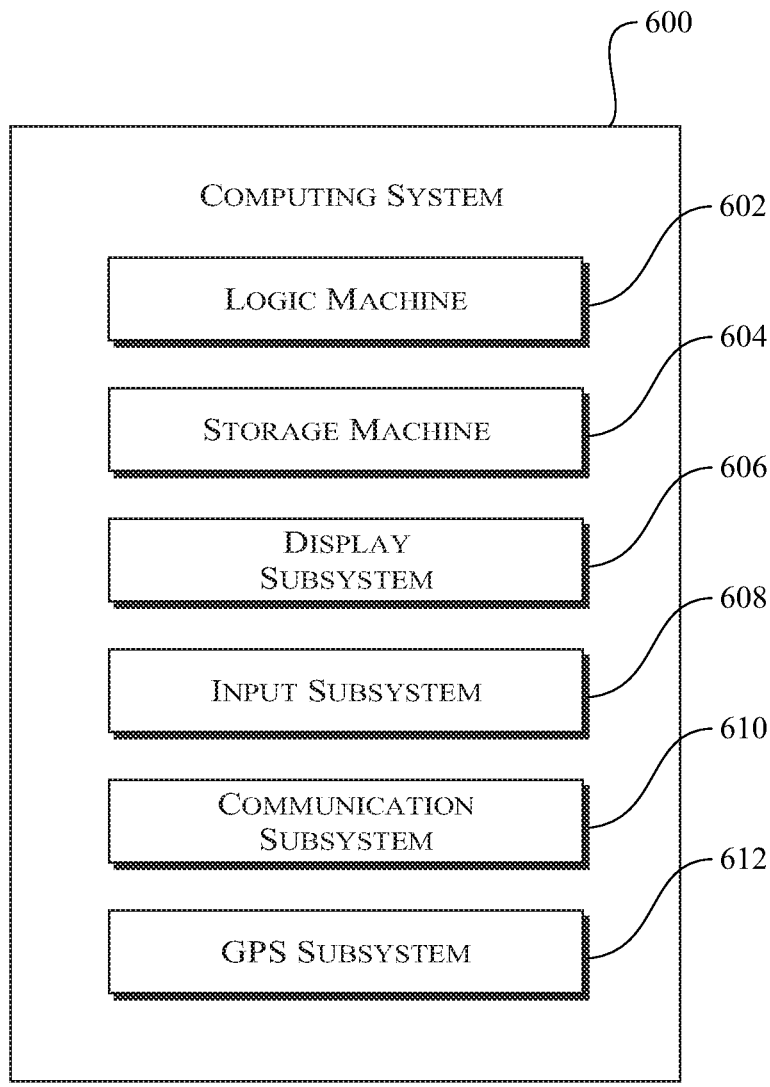
FIG. 6 presents an exemplary computing system, in accordance with aspects of the present disclosure.

At step 102, the method 100 includes receiving a navigational chart. For example, the navigational chart may be a STAR such as that presented in FIG. 2 (STAR 200). It is to be understood that the navigational chart may be a DP or an IAP, or any appropriate geographic map. The navigational chart may be non-linear or not to scale with respect to real geographic distances, proportions, and scales. For example, on a non-linear map, a length ratio of two line segments is not equivalent to a ratio of corresponding geographic segments on earth. Such non-linearity can be seen in FIGS. 2 and 3 where a represented 52 mile distance (in parentheses) between waypoint (i.e. fix) ORMOND BEACH and DIINO appears shorter than the represented 25 mile distance between DIINO and QUASH. Therefore, the real geographic scale (e.g. geographic distance) between two waypoints on a navigational chart may be different than a real geographic scale (i.e. geographical image scale) between two other waypoints on the same navigational chart. It is to be understood that the navigational chart may be any appropriate non-linear map on which a position of an object can be displayed, and the spirit and scope of this disclosure is not intended to be limited in this regard. For example, various military maps may be received that display positions of military units such as tanks or vehicles or personnel, and these positions may be updated and displayed in real-time. As such, a position of any waypoint or fix described herein may be updated in real time. As another non-limiting example, the map could be a map of hotel grounds or a golf course, or any chart containing coordinates. The navigational chart may be received at a computing device (i.e. device 402 in FIG. 5) from a server or a computing device of an aviation authority such as the FAA or any navigational chart server. A navigational chart may be provided to a respective device as any appropriate image file, such as a PDF or PNG file. In some embodiments, a received PDF file is converted to a PNG file to reduce file size for easier processing and communicating of navigational charts. For example, FIG. 4 shows one or more navigational charts 416 being stored on a content server network 408 of a mapping system 400. Navigational charts may be received by the content server network 408, and/or device 402. The content server network 408 may include a networked aviation authority that provides navigational charts, or any appropriate non-aviation authority. In some instances, the content server network 408 is physically separate from an authority, however in such an embodiment the navigational charts are still communicated to the content server network as shown in FIG. 5 via a computer network. The content server network 408 may include one or more computing devices such as computing system 600 of FIG. 6 for communicating the navigational charts electronically over a network (e.g. a wireless computer network or the internet), such as the network 500 shown FIG. 5. Any appropriate communication method may be included for communicating the navigational charts as known in the art. For example, navigational charts may be communicated between a navigational authority, the content server network 408, and/or the device, or other appropriate entity via communication subsystem 610, and may be processed via logic machine 602 and stored via storage machine 604 for being displayed to a user via display subsystem 606. In some embodiments, the device may be a certified navigational computer, or any appropriate certified computing device configured to communicate wirelessly with an ATC or an air navigation service provider and may be configured to receive data such as navigational charts, map data, geographic coordinates, and image X, Y coordinates of points on a map image. For example, such a navigational computer may include the computing system 600 for receiving navigational charts, communicating geographic coordinates, displaying the navigational charts, and displaying device positions to a pilot user. Any appropriate device may be included to receive the navigational charts. For example, a touch screen tablet computer, mobile phone, or laptop computer may be an appropriate device. Device 402 may be such a computing device. It is to be understood that any of the herein described maps or data may be partially or entirely stored locally on the device 402.

At step 104, the method 100 includes identifying georeferenceable points of a received navigational chart. For example, the georeferenceable points may be manually identified, and may be waypoints, fixes, airports, navigational aids, or any appropriate point which can be identified as having associated real world geographic coordinates. For example, a set or plurality of geographic coordinates (geographic coordinates 414) for various georeferenceable points may be stored in a database such as database 412 of FIG. 4, which can be accessed by a manual identifier such as an employee user. Such an employee user may interface with a computing device that is included in the content server network. Geographic coordinates of georeferenceable points are referred to herein for simplicity as point geographic coordinates. In some instances the georeferenceable points may be visually identified, and their corresponding image X, Y coordinates may be stored on the database (as further described below with respect to Table 1-1). Image X, Y coordinates may be stored manually by a user, or automatically via the system. For example, a user may manually select a location on a navigational chart image, and corresponding image X, Y coordinates of that selected point may be automatically or manually entered into the database in response to the selection. In some embodiments, a user manually enters such image X, Y coordinates via a coordinate data entry box. Image X, Y coordinates of the georeferenceable points may be simply referred to as point X, Y coordinates. Image X, Y coordinates are not real world geographic coordinates, and may be addressed with respect to pixels or pixel locations of a map image. The database may be located at an air navigation service provider (e.g. air navigation service provider 502 of FIG. 5) or an aviation authority system, and/or within the content server network 408. As such, the content server network may include one or more servers for serving, providing or storing the navigational charts, geographic coordinates (e.g. of a georeferenceable point or a device), or georeferenceable points accordingly. For example, at step 106, geographic coordinates of the identified georeferenceable points are received. As such, upon receiving a valid request, geographic coordinates for the georeferenceable points may be sent to an employee user of a device for processing as further described below. In some embodiments, the georeferenceable points are automatically determined by a chart rendering engine in a preprocessing step or in real-time. Table 1-1 below is an exemplary table presenting two arbitrary waypoints and corresponding image X, Y coordinates and real geographic coordinates.

TABLE 1-1

| GEOREFERENCEABLE POINT | X, Y COORDINATES ON IMAGE | GEOGRAPHIC COORDINATES |
| --- | --- | --- |
| Waypoint A | (80%, 20%) | Lat: 39° 55' 40.3968" Long: 32° 51' 19.083" |
| Waypoint B | (23%, 79%) | Lat: 41° 1' 40.1298" Long: 28° 59' 2.3778" |

In some embodiments, the georeferenceable points may be identified automatically. For example, when a STAR is being generated, or more particularly when points such as waypoints or fixes are being overlaid on the STAR, such points may be automatically saved on a database (e.g. on content server network 408) along with corresponding geographic coordinates for each point. For example, a table or matrix may be generated that associates points on a STAR with corresponding real geographic coordinates. As such, the georeferenceable points and/or the point X, Y coordinates may be automatically determined by a computing system that accesses the database or table, to pull, receive, request, or access respective geographic coordinates. For example, a computing device may send a request to the content server network to receive geographic coordinates, point X, Y coordinates, or a list of georeferenceable points. Upon receiving the request, the geographic coordinate, point X, Y coordinates, and/or the list of georeferenceable points may be sent to the computing device. As such, the table or matrix may also include X, Y coordinates of a map image that correspond to the georeferenceable points and geographic coordinates. For example, image X, Y coordinates may be addressed as a percentage of a total width and height of a map image, respectively (as shown in Table 1-1). It is to be understood that any appropriate method may be used for processing or addressing image X, Y coordinates.

At step 108, segments lying between the georeferenceable points are generated, identified or determined. For example, two georeferenceable points may be connected to form a segment. In other words, a segment lies between two georeferenceable points. A segment may be formed between every georeferenceable point. A number of segments may be determined by the following equation: (# of segments)=$(n^2-n)/2$ where n=number of points. As such, a greater number of points results in a greater number of segments accordingly. A greater number of segments or georeferenceable points increases mapping accuracy and effectiveness.

At step 110, geographic coordinates of a device are received. A device (i.e. mobile device) may include a global positioning system (GPS) locator such as locator 406 of device 402 shown in FIG. 4. For example, the locator 406 may send GPS coordinates of the mobile device to the content server network 408 as location data as shown in FIG. 4. The GPS locator 406 may be included in GPS subsystem 612 of computing system 600 shown in FIG. 6. Any appropriate geographic locator device may be included to determine and communicate current geographic coordinates of a mobile device. It is to be understood that any appropriate vehicle or ground personnel may include such a locator such as tanks, trucks, or naval vessels. A GPS or other suitable locator may be located at the vehicle—e.g., housed within or otherwise coupled to the vehicle body.

At step 112, a current position of a mobile device is mapped and displayed on a navigational chart. The position may be mapped at a mobile device or at a computing device of the content server network (e.g. via mapper 410 of FIG. 4). For example, the mapper 410 may include a rendering engine. The method may include first converting a received image file to an image file format that has a more manageable file size (e.g. converting a PDF file to a PNG file). Mapping and displaying the position may include first identifying a nearest segment to the mobile device (e.g. by determining if the mobile device position is within a certain threshold image X, Y or real geographic distance from a segment). For example, the geographic coordinates of the mobile device (i.e. mobile device geographic coordinates) may be checked or referenced with the point geographic coordinates stored on a database of the content server network. As another example, a finite segment that lies nearest to a geographic coordinate point may be determined. In some embodiments, only pre-defined segments may be determined as a nearest segment (e.g. pre-defined segments provided in the STAR of FIG. 2). Such pre-defined segments may be stored in a database of an air navigation provider such as the FAA. In other embodiments, a plurality of segments (excluding airports and/or navaids) may be used as a basis for mapping the mobile device position if the mobile device is determined as being further than the threshold described above (e.g. 4 nm). In yet another embodiment, airports and/or navaids are considered when determining which segments are to be used to map the mobile device position as described herein. As such, first, nearest pre-defined segments are determined. If no pre-defined segments are found within a certain threshold distance (e.g. 4 nm), then airports, navaids, waypoints, fixes, and/or a plurality of other segments may be identified for mapping the mobile device position.

Figure 2:
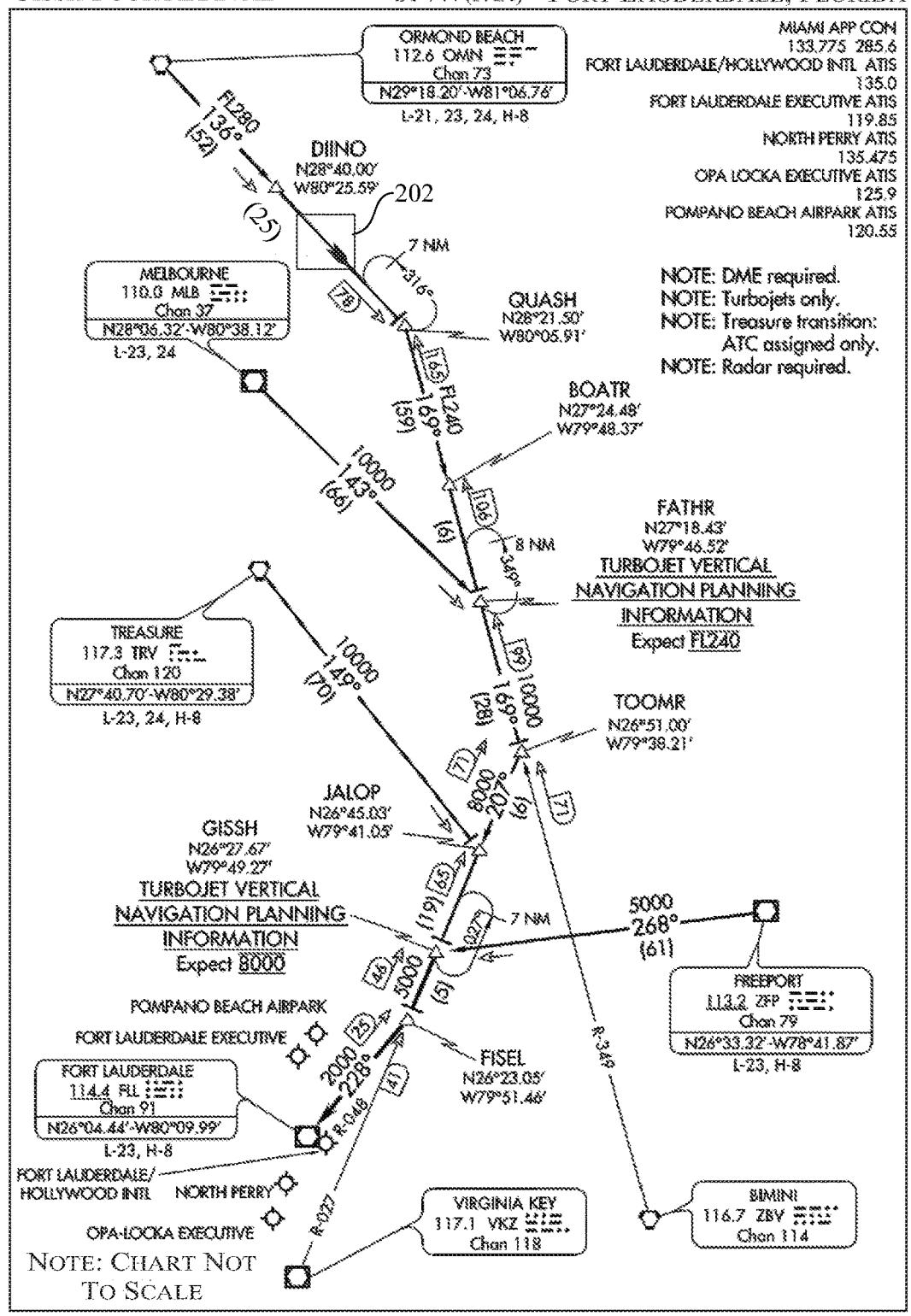
FIG. 2 presents a non-linear navigational chart, in accordance with aspects of the present disclosure.

Upon detecting a nearest segment, the mobile device mapping system may assume the detected segment is linear, and via interpolation and/or extrapolation the mobile device position may be accurately mapped along the detected segment by using the mobile device geographic coordinates and the point geographic coordinates. The mobile device position may be mapped by converting geographic coordinates to image X, Y coordinates using an image X, Y length or scale of a segment as a basis for the conversion. For example, FIG. 2 shows a mobile device symbol 202 being displayed between waypoints DIINO and QUASH. A heading of the mobile device may also be represented. For example, the heading of the mobile device symbol 202 is pointed toward QUASH in FIG. 2. In embodiments where angles between points do not accurately represent real geographic angles between real geographic locations, the heading may be corrected by calibrating an actual heading of the mobile device with a displayed heading. In each segment, a known real heading of a mobile device may be compared to a corresponding image heading to calibrate the displayed heading. For example, a real heading of 90 degrees (East) may correspond to a real geographic waypoint, however, on a non-linear STAR, the geographic waypoint may be presented as being located at a different, incorrect heading due to the non-linear nature of the STAR and the displayed position of the mobile device. Therefore, the system may calibrate or equate a real heading to a virtual heading on the map for correctly displaying the heading. It is to be understood that a plurality of mobile device positions may be mapped and displayed on the navigational chart. For example, each mobile device shown in FIG. 5 may be included in each mobile object that needs to be mapped.

Figure 3:
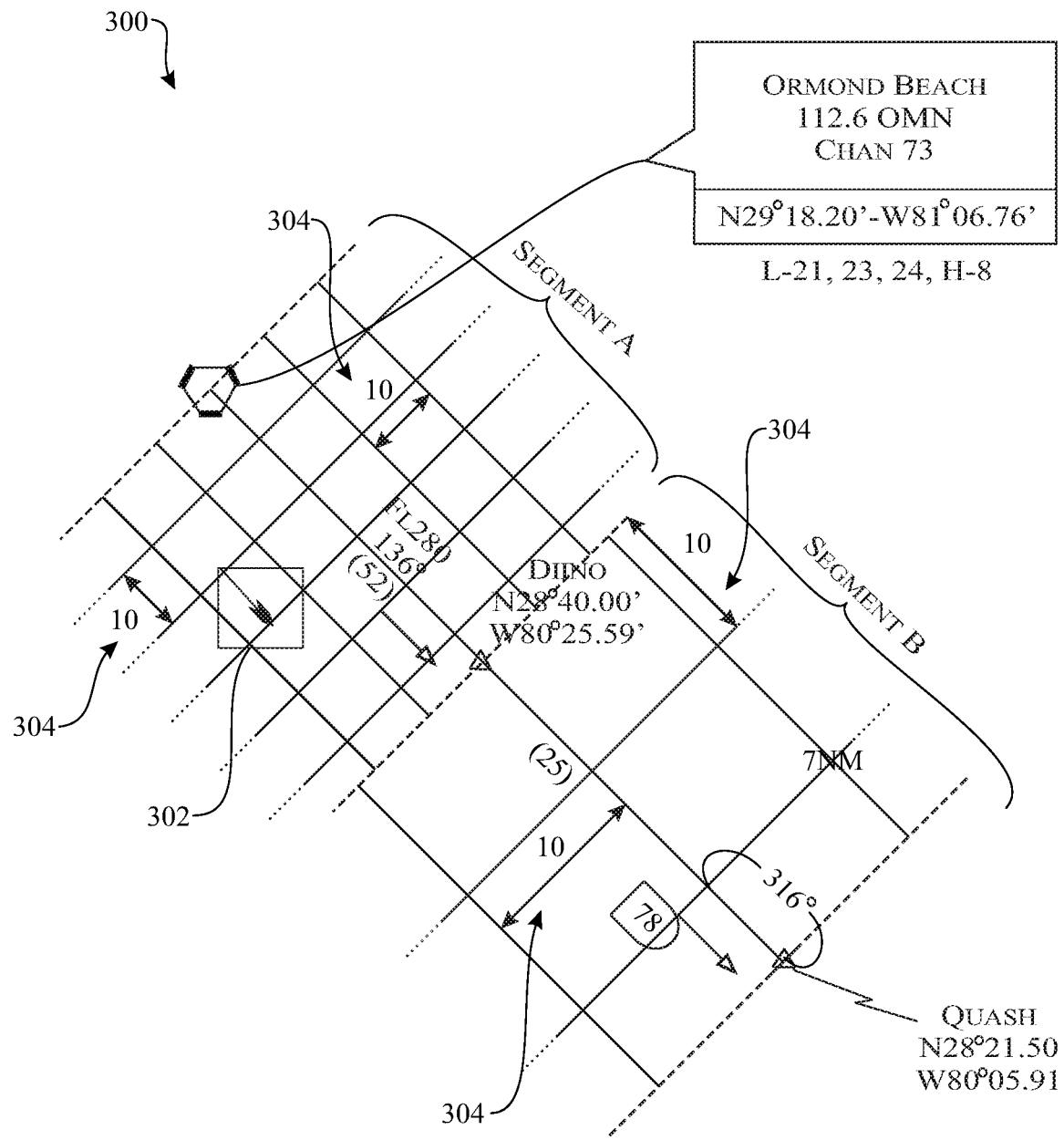
FIG. 3 presents exemplary grids of the non-linear navigational chart, in accordance with aspects of the present disclosure.

The illustration of FIG. 3 presents at 300, two adjacent segments with an arbitrary real geographic distance unit overlaid on the two segments as a grid. Each segment includes a grid that has spacings, each spacing representing a real geographic distance unit. FIG. 3 also presents an exemplary mobile device position 302. For example, segment A is between ORMOND BEACH and DIINO, and segment B is between DIINO and QUASH. As FIG. 3 shows at 304, 10 real world geographic distance units (e.g nm or any appropriate geographic distance unit) are represented on the map image as having differing image X, Y lengths for each segment grid of segment A and segment B. As presented, comparatively, a real geographic unit has a shorter image X, Y length in segment A than that of segment B. For example, a mobile device traveling at a constant velocity in the real world while being mapped in real time will appear to travel slower on segment A compared to segment B, since these segments have different scales, and are not linear with respect to real geographic distances. For example, the real distance between ORMOND BEACH and DIINO is 52 miles and the real distance between DIINO and QUASH is 25 miles, as denoted in parentheses. However, on the image of this map, the segment lengths are displayed as being approximately equivalent. Therefore, a real geographic unit will appear to have different X, Y lengths on a non-linear STAR such as that of FIG. 2. Each segment may have particular image X, Y dimensions. For example, each segment may have a two dimensional grid, as shown, the grid having boundaries at waypoints. Such boundaries are shown in dashed line, extending through waypoints ORMOND BEACH, DIINO, AND SQUASH, respectively. For example, these boundaries may be perpendicular to a respective line segment disposed between waypoints. Such a respective line segment is one which is identified as being nearest to a real world mobile device position. For example, the boundaries are determined according to which segment the mobile device is being mapped on. As shown via finer dotted line (extending parallel along a dimension of such respective boundaries), each segment may have a dimension that is perpendicular (or orthogonal) to a respective line segment (between two waypoints), extending indefinitely.

As such, the segments may include a two dimensional space, with one dimension extending indefinitely in a perpendicular direction relative to a line segment on which a mobile device position is being mapped. In some embodiments, the perpendicular dimension may have a boundary determined by a user or in some embodiments the mapper 410. For example, such a boundary may be determined with respect to surrounding waypoints, fixes, or navigational aids to maintain a clear and accurate display of a mobile device position with respect to a respective segment. Upon crossing such a boundary, the respective segment for mapping the mobile device position may switch to an adjacent segment. For example, upon crossing the boundary at waypoint DIINO, the respective mapping segment may switch from segment A to segment B. Accordingly, various aspects of mapping a mobile device position may change when a transition between a first segment associated with a first image spacing/scale and a second segment associated a second, different image spacing/scale occurs, including but not limited to an apparent speed and/or heading displayed in a chart. For example, a new segment may be identified as being nearest the mobile device and/or georeferenceable point or coordinate, and one or more aspects (image aspect) of the mapping may be changed upon identifying the new segment as being nearest the mobile device.

The mobile device position may be mapped and displayed in various ways via a mapper 410. The mapper 410 is shown in FIG. 4 as being part of the content server network 408. In some embodiments, the mapper 410 is included in the mobile device. The mapper 410 may be a downloadable or installable software application that includes instructions for mapping positions on a non-linear map according to the present disclosure. For example, as described above and with respect to FIG. 2, the mobile device position may be mapped and displayed directly on a nearest segment, or a segment in which a mobile device is determined to be passing through. In other embodiments, the mobile device position may be accurately represented and displayed as being offset from a displayed line segment by using the grid system described with respect to FIG. 3. For example, according to the mobile device geographic coordinates and the point geographic coordinates, a mobile device position on a particular segment or a particular grid of a segment may be accurately determined and displayed on the particular grid or segment via interpolation and/or extrapolation methods known in the study of mathematics. For example, the extrapolation methods may be included to determine a position beyond points on a line segment. For example, via interpolation a line segment between two points may be generated as a linear interpolant. Via extrapolation, a point lying outside the domain of the linear interpolant may be determined. In other words, in interpolating, the system only considers a line between two points, but in extrapolating, the system considers an infinite line defined by two points. In some embodiments, a real distance scale may be converted to an image X, Y scale for mapping the mobile device position to a particular segment. Any appropriate symbol may be displayed as a mobile device position, such as a simple dot, triangle, square, or the like. In some embodiments, only a particular segment is highlighted without actually displaying a mobile device position. Further, in some embodiments, both a particular segment and a mobile device position may be highlighted and displayed.

As shown in FIG. 4, the content server network sends map data to the mobile device 402. For example, the map data may include mapping instructions for accurately and appropriately positioning an airplane symbol on a STAR (e.g. via determined image X, Y coordinates as described above). These mapping instructions may be generated by the mapper 410. In some embodiments a STAR map that includes a previously mapped (i.e. preprocessed) mobile device position may be included in the map data. For example, after the mobile device receives the map data, the map data may be displayed via the display 404 (e.g. via display subsystem 606) of the mobile device. The map data may be generated on the mobile device or the content server network, and may include image X, Y coordinates, mobile device heading values, point geographic coordinates, mobile device geographic coordinates, a list of georeferenceable points, or data described in Table 1-1. The map data may be updated in real time, and as such, a position of the mobile device may be updated in real time and appropriately overlaid over a STAR.

In some embodiments the methods and/or tasks described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. For example, a suitable computing system may be computing system 600 shown in FIG. 6. When such methods and processes are implemented, the state of the storage machine 604 may be changed to hold different data. For example, the storage machine 604 may include memory devices such as various hard disk drives, CD, or DVD devices. The logic machine 602 may execute machine-readable instructions via one or more physical information and/or logic processing devices. For example, the logic machine 602 may be configured to execute instructions to perform tasks for a computer program. The logic machine 602 may include one or more processors to execute the machine-readable instructions. The computing system 600 may include a display subsystem 606 to display a graphical user interface (GUI) or any visual element of the methods or processes described above. For example, the display subsystem 606, storage machine 604, and logic machine 602 may be integrated such that the above method may be executed while visual elements of the disclosed system and/or method are displayed on a display screen for user consumption. The computing system 600 may include an input subsystem 608 that receives user input. The input subsystem 608 may be configured to connect to and receive input from devices such as a mouse, keyboard or gaming controller. For example, a user input may indicate a request that a certain task is to be executed by the computing system 600, such as requesting the computing system 600 to display any of the above described information, or requesting that the user input updates or modifies existing stored information for processing. A communication subsystem 610 may allow the methods described above to be executed or provided over a computer network. For example, the communication subsystem 610 may be configured to enable the computing system 600 to communicate with a plurality of personal computing devices. The communication subsystem 610 may include wired and/or wireless communication devices to facilitate networked communication. The described methods or processes may be executed, provided, or implemented for a user or one or more computing devices via a computer-program product such as via an application programming interface (API). The GPS subsystem 712 includes devices to receive send GPS coordinates of one or more devices.

In conclusion, disclosed is a system and method for accurately mapping a mobile device position on a non-linear map. The method includes mapping the mobile device position on segments that lie between waypoints on the map by converting geographic coordinates to image X, Y coordinates using an image X, Y length or scale of respective segment as a basis for the conversion.

The input is a coordinate that can be obtained from anywhere (pre-written, GPS receiver, INS, etc), a non-linear map of a DP, STAR, hotel ground, golf course, etc, and the output is an X, Y location on that map. This X, Y location can be used in several ways, one of which is displaying the input coordinate using an icon, or the X, Y locations could be used stored or transmitted. The input coordinate does not have to come from a mobile device and the output does not have to be on the device's screen.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A system for mapping a position on a navigational chart, comprising:
   one or more storage machines holding instructions executable by one or more logic machines to:
   receive the navigational chart;
   receive geographic coordinates of an electronic mobile device as electronic mobile device geographic coordinates;
   identify georeferenceable points on the navigational chart;
   receive point geographic coordinates derived from the georeferenceable points coordinates;
   determine the position of the electronic mobile device relative to the point geographic coordinates and the electronic mobile device geographic coordinates;
   map the position of the electronic mobile device on the navigational chart according to the point geographic coordinates and the electronic mobile device geographic coordinates;
   identify a segment between two of the georeferenceable points;
   map the position of the electronic mobile device on the navigational chart according to the segment;
   wherein a first length ratio between two of the segments is not equal to a second length ratio between corresponding real physical geographic distances; and
   display a real-time position of the electronic mobile device on the navigational chart to a user of the navigational chart; and
   wherein the user is able to make a decision to navigate a vehicle toward or away from a point of interest using the navigational chart.

2. The system of claim 1, wherein the segment is one of a plurality of segments, the segment being nearest the electronic mobile device.

3. The system of claim 1, wherein the segment is one of the plurality of segments, the segment being nearest a point geographic coordinate of one of the georeferenceable points.

4. The system of claim 1, wherein the instructions executable to map the position of the electronic mobile device on the navigational chart include instructions executable to convert the point geographic coordinates to image coordinates using a geographical image scale of the segment.

5. The system of claim 1, wherein the instructions are executable to map the position of the electronic mobile device with respect to the segment via one or both of interpolation and extrapolation such that, the georeferenceable points have respective image points on the navigational chart, the image points having image X-Y coordinates that define their location on the navigational chart;

via interpolation the segment between two image points on the navigational chart is generated as a linear interpolant; via extrapolation, an image point lying outside a domain of the linear interpolant is determined; and by using the interpolant as a basis and via extrapolation, the system maps the position of the mobile device on the navigational chart with respect to the segment that was generated as the linear interpolant.

6. The system of claim 1, wherein the segment is a first segment associated with a first geographical image scale, and the instructions executable to map the position of the electronic mobile device on the navigational chart include instructions executable to:

identify a second segment associated with a second geographical image scale; and upon identifying the second segment as being nearest the electronic mobile device, change an aspect of the mapping according to the second geographical image scale.

7. The system of claim 1, wherein the instructions are executable to identify the segment are executable to connect the two georeferenceable points.

8. The system of claim 1, wherein the geographic coordinates of the electronic mobile device are received from a GPS locator located at the electronic mobile device.

9. The system of claim 1, wherein the instructions are further executable to display on a display device the navigational chart including the position of the electronic mobile device.

10. The system of claim 1, wherein the navigational chart is non-linear.

11. The system of claim 1, wherein the navigational chart is one of a STAR, a DP, and an IAP chart.

12. A method for mapping a position on a navigational chart, comprising:

receiving the navigational chart;

receiving geographic coordinates of an electronic mobile device as mobile device geographic coordinates;

identifying georeferenceable points on the navigational chart;

receiving geographic coordinates of the georeferenceable points as point geographic coordinates;

determine the position of the electronic mobile device relative to the point geographic coordinates and the electronic mobile device geographic coordinates;

mapping the position of the electronic mobile device on the navigational chart according to the point geographic coordinates and the electronic mobile device geographic coordinates;

identifying a segment between two of the georeferenceable points;

mapping the position of the electronic mobile device on the navigational chart with respect to the segment;

wherein the position is mappable offset from the segment to represent the position of the electronic mobile device not on the segment;

display a real-time position of the electronic mobile device on the navigational chart to a user of the navigational chart; and wherein the user is able to make a decision to navigate a vehicle toward or away from a point of interest using the navigational chart.

13. The method of claim 12, wherein mapping the position of the electronic mobile device on the navigational chart includes converting the point geographic coordinates to image coordinates using a geographical image scale of the segment.

14. The method of claim 12, wherein the segment is a first segment associated with a first geographical image scale, the method further comprising:

identifying a second segment associated with a second geographical image scale; and upon identifying the second segment as being nearest the electronic mobile device, changing an aspect of the mapping according to the second geographical image scale.

15. The method of claim 12, wherein the navigational chart is non-linear, and the navigational chart is one of a STAR, a DP, and an IAP chart.

\* \* \* \* \*